UNITED STATES PATENT OFFICE.

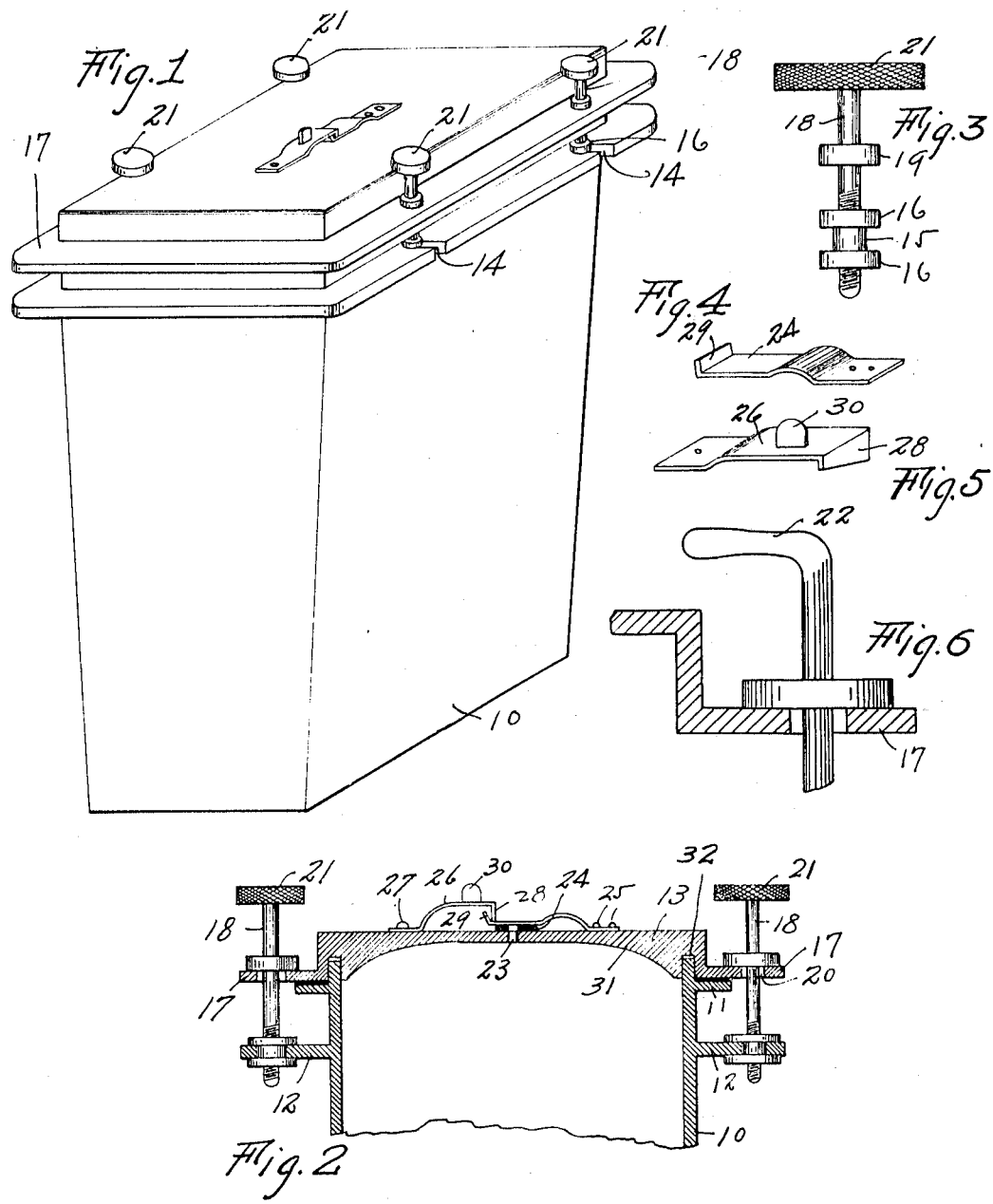

FRITZ H. MILLER, OF WILBUR, WASHINGTON.

PROVISION-RECEPTACLE.

1,055,206.

Specification of Letters Patent.

Patented Mar. 4, 1913.

Application filed May 4, 1912. Serial No. 695,308.

*To all whom it may concern:*

Be it known that I, FRITZ H. MILLER, a citizen of the United States, residing at Wilbur, in the county of Lincoln and State of Washington, have invented certain new and useful Improvements in Provision-Receptacles; and I do hereby declare the following to be a full, clear, and exact description of the invention, such as will enable others skilled in the art to which it appertains to make and use the same.

This invention relates to improvements in preserving apparatus, and is more particularly related to a provision receptacle for receiving and storing cooked meats and the like until the same are required for use.

The main and primary object of the present invention is the provision of a receptacle of the character stated, the construction of which is such as to permit the exit of the gases generated in meats which are steam cooked or boiled, and to prevent the entrance of air into the receptacle until it is desired to open the latter to remove the contents thereof.

The invention further aims to provide a construction of provision receptacle which is such as to be capable of repeated use, the same including simple and efficient means for engaging and locking the cover thereof to the receptacle body, whereby, while the cover is held in proper engagement with the body, the receptacle may be easily opened and access had to the interior thereof.

Having these general objects in view, and others which will appear as the nature of the improvements is better understood, the invention consists substantially in the novel construction, combination, and arrangement of parts hereinafter fully described, illustrated in the accompanying drawings, and pointed out in the appended claims.

In the drawings: Figure 1 is a perspective view of the provision receptacle constructed in accordance with the present invention. Fig. 2 is a vertical transverse sectional view of the upper portion of the receptacle with the cover applied thereto, the point of section being taken on an unbroken line through certain of the fastening devices and the gas vent. Fig. 3 is a detail elevation of one of the fastening screws, and the displaceable locking nut by which it is engaged with the body of the receptacle. Fig. 4 is a detail perspective view of the vent valve. Fig. 5 is a similar view of the means for holding the vent valve in position over the vent. Fig. 6 is an elevation illustrating another form of fastening device.

Referring in detail to the accompanying drawings, the numeral 10 designates the body of the herein described receptacle. This may be of any desired contour, but is preferably rectangular in form, and said body is provided adjacent its upper open end with a pair of external flanges 11 and 12, the flange 11 forming a support for a removable cover 13, while the flange 12 performs the function of a locking flange for engagement by the fastening devices through the medium of which the cover 13 is held upon the body 10. It will be noted that the flanges 11 and 12 extend entirely around the outside of the body 10. At appropriate points in the flange 11 is provided a series of notches 14, said notches being designed to receive locking nuts 15. The nuts 15 are provided at their ends with terminal flanges 16, and when the nuts 15 are positioned in the notches 14 these flanges 16 are disposed at the upper and lower sides of the locking flange 12. Surrounding the cover 13 is a screw carrying flange 17, and arranged in said flange 17 is a plurality of fastening screws 18 corresponding in number to the number of the notches 14. Each of the screws 18 is provided with an annular shoulder 19 which seats against the upper side of the screw carrying flange 17, and thus offers resistance to the longitudinal movement of the screws 18 in a downward direction. The screw carrying flange 17 is provided with openings 20 for the reception of the screws 18. While the screws 18 are provided with milled heads 21 for their operation, they may be provided with a handle bar 22, as illustrated in Fig. 6. With the screws 18 positioned in the screw carrying flange 17, and the locking nuts 15 seated in the notches 14 of the flange 12, it will be apparent that proper manipulation of the fastening screws 18 will cause the cover 13 to move toward the body 10 and to bind thereon. Inasmuch, however, as the locking nuts 15 are displaceable from the notches 14, the entire structure including the cover 13, fastening screws 18, and nuts 15 may be readily displaced from the body 10 when it is desired to open the latter.

In packaging meats which are either steam cooked or boiled, provision must be made for the escape of gases from the inside of the receptacle, and at the same time to seal the receptacle against the entrance of air. To accomplish this purpose the cover 13 is provided with a gas vent 23 at an appropriate point therein, said vent being closed by a leaf valve 24 which is arranged at the exterior of the cover 13 and secured thereto as by rivets 25, or other suitable fastening devices. The valve 24 is formed of flexible material, and thus is adapted to yield under pressure within the body 10. Hence, the gases generated therein will raise the valve 24 from the vent 23, and thereby gain access to the atmosphere, but when pressure has been relieved, the valve 24 will again seat upon the vent 23, and thus seal the latter against the admission of air. A suitable packing may be employed with the valve 24 for properly sealing the vent 23.

For holding the valve 24 in closed position over the vent 23 a resilient retainer 26 is employed. This retainer is pivoted, as at 27, to the cover 13, and its free end is provided with a depending lip 28 which extends over an upwardly curved flange 29 at the free end of the valve 24. The retainer 26 is also provided with a finger piece 30 to facilitate swinging the same upon its pivot, and thus freeing the retainer from engagement with the valve 24.

To compact the contents of the receptacle 10, and thereby assist in expelling the gases through the vent 23, the inner side of the cover 13 is made concaved, as at 31. This construction, therefore, provides in proximity to the outer edge of the body 13 a marginal groove 32 into which the upper edges of the walls of the body 10 fit. Because of this construction the sealing effect of the cover 13 in relation to the body 10 is greatly enhanced.

In the use of the herein described can, the meats are placed within the body 10 and the cover 13 placed thereon. With the locking nuts 15 positioned in the notches 14, and the screws 18 engaged with said nuts, it will be seen that as the screws 18 are tightened the cover 13 is forced downwardly upon the can and into engagement with the supporting flange 11 of the body. As the cover 13 is thus tightened the contents of the body are squeezed, and the pressure thus exerted on the contents directs the gases or any air which may have accumulated in the receptacle, to and through the vent 23, the valve 24 being displaced in an obvious manner. When expansion has ceased, the valve 24 seals the can against the admission of air, and the contents are thereby preserved until required for use. After the can has been emptied of its contents, the destruction of no parts being necessary to effect the opening of the can, the latter is preserved in its integrity and may be used repeatedly for the preservation of such articles of food as it is necessary to cook and retain with the air excluded therefrom.

Having thus described the invention, what is claimed as new, and desired to be secured by Letters Patent, is:—

1. A provision receptacle, comprising a body provided with a locking flange having a series of notches therein, a removable cover for said body provided with a screw carrying flange, flanged locking nuts seated in said notches, and fastening screws associated with the screw carrying flange of said cover and engaging the flanged locking nuts for holding the cover in associated relation with said body.

2. A provision receptacle, comprising a body, having a locking flange provided with a series of notches, locking nuts seated in said notches and having terminal flanges which embrace the upper and lower sides of said locking flange, a removable cover, and fastening screws carried by said cover and adapted to engage said locking nuts for holding said cover upon said body.

3. A provision receptacle, comprising a body provided adjacent its upper portion with a pair of external flanges, one of said flanges forming a support, and the other provided with a plurality of notches, a detachable cover for said receptacle seated upon the supporting flange thereof, locking nuts associated with said notched flange, and fastening screws carried by said cover and engaging said locking nuts to hold the cover in engagement with said body.

4. A provision receptacle, comprising a body provided adjacent its upper end with a pair of flanges arranged in superimposed relation, the upper of said flanges forming a support, and the lower of said flanges being provided with a plurality of notches, a detachable cover for said body provided with a screw carrying flange and seated upon the supporting flange of the body, fastening screws associated with said screw carrying flange, and flanged locking nuts seated in said notches and adapted to be engaged by said fastening screws to hold the cover in engagement with said body.

In testimony whereof I affix my signature in presence of two witnesses.

FRITZ H. MILLER.

Witnesses:
 FRAANDS MADSEN,
 C. M. N. LOVE.